United States Patent [19]

Taniguchi

[11] Patent Number: 4,598,200
[45] Date of Patent: Jul. 1, 1986

[54] RADIATION IMAGE READ-OUT APPARATUS

[75] Inventor: Yutaka Taniguchi, Kanagawa, Japan

[73] Assignee: Fuji Photo Film Co., Ltd., Kanagawa, Japan

[21] Appl. No.: 626,001

[22] Filed: Jun. 29, 1984

[30] Foreign Application Priority Data

Jul. 4, 1983 [JP] Japan .................. 58-121324

[51] Int. Cl.$^4$ ............................................. G03C 5/16
[52] U.S. Cl. ................................................ 250/327.2
[58] Field of Search ............... 250/327.2, 484.1, 369, 250/368

[56] References Cited

U.S. PATENT DOCUMENTS

| 4,258,264 | 3/1981 | Kotera et al. | 250/484 |
|---|---|---|---|
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |

Primary Examiner—Janice A. Howell
Attorney, Agent, or Firm—Sughrue, Mion, Zinn, Macpeak & Seas

[57] ABSTRACT

An apparatus for reading out a radiation image stored in a stimulable phosphor sheet comprises a scanner for scanning the stimulable phosphor sheet by stimulating rays which cause it to emit light in proportion to the radiation energy stored, a light guiding sheet for guiding the emitted light to a light output face, and a photodetector having a light receiving face for detecting the light guided by the light guiding sheet. A plate exhibiting a refractive index approximately equal to that of the light guiding sheet is closely contacted with the light output face. A first cover is closely contacted with the plate, and a second cover is closely contacted with the circumferential surface of the photodetector so that the light receiving face thereof stands face to face with the plate in spaced relation. The second cover is removably joined with the first cover in liquid-tight condition. The space between the light receiving face and the plate is filled in hermetically sealed condition with transparent liquid exhibiting a refractive index approximately equal to that of the plate.

10 Claims, 5 Drawing Figures

RADIATION IMAGE READ-OUT APPARATUS

BACKGROUND OF THE INVENTION

1. Field of the Invention

This invention relates to an improvement in a radiation image read-out apparatus for reading out a radiation image stored in a stimulable phosphor sheet by exposing the stimulable phosphor sheet to stimulating rays which cause it to emit light in proportion to the radiation energy stored and photoelectrically detecting the emitted light.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to a stimulating ray such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,276,473 and 4,315,318, 4,387,428 and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays such as a laser beam which cause it to emit light in proportion to the radiation energy stored. The light emitted from the stimulable phosphor sheet when the sheet is exposed to the stimulating rays is guided by a light transferring means and photoelectrically detected and converted by a photodetector to an electric image signal. By use of the electric image signal, a light beam is modulated to reproduce a visible radiation image on a recording medium such as a photographic film.

As the light transferring means used in the aforesaid radiation image recording and reproducing system, a light transferring means consisting of a light guiding sheet is disclosed, for example, in U.S. Pat. No. 4,346,295. The light transferring means is fabricated by forming an acrylic light guiding sheet or the like so that one end face (light input face) is linear and the other end face (light output face) matches the shape of the light receiving face of a photodetector. The light output face is closely contacted with the photodetector. In general, between the light output face of the light transferring means and the photodetector is positioned a filter for passing only the light emitted from the stimulable phosphor sheet when the sheet is exposed to stimulating rays. The light output face of the light transferring means, the filter, and the light receiving face of the photodetector are closely contacted with each other. That is, the light transferring means, the filter, and the photodetector are closely contacted and formed integrally with each other. In some cases, instead of using the filter, the light transferring means is colored so that it acts in the same manner as a filter.

However, when the light transferring means, the filter and the light receiving face of the photodetector (or the light transferring means and the light receiving face of the photodetector when the filter is not used) are closely contacted and formed integrally with each other, it is impossible to detach the photodetector from the light transferring means and the filter. Therefore, when the photodetector, which has a much shorter service life than the light transferring means and the filter, has to be replaced, the light transferring means and the filter (or the light transferring means in the case where the filter is not used) must also be replaced together with the photodetector. This is very disadvantageous from the economical viewpoint.

SUMMARY OF THE INVENTION

The primary object of the present invention is to provide an economical radiation image read-out apparatus in which the photodetector alone can be readily replaced.

Another object of the present invention is to provide a radiation image read-out apparatus comprising a detachable photodetector so that no interfacial light reflection arises between the light output face of the light transferring means and the light receiving face of the photodetector.

The present invention provides a radiation image read-out apparatus including (i) a scanning means for scanning a stimulable phosphor sheet carrying a radiation image stored therein with stimulating rays which cause said stimulable phosphor sheet to emit light in proportion to the radiation energy stored, (ii) a photodetector for detecting the light emitted from said stimulable phosphor sheet, and (iii) a light transferring means having one end face constituting a light input face positioned close to a scan line on said stimulable phosphor sheet, and another face constituting a light output face formed to a shape matching the shape of a light receiving face of said photodetector and positioned close to said light receiving face, said light transferring means being fabricated of a light guiding sheet-like material exhibiting a refractive index approximately equal to that of said light receiving face and being positioned between said photodetector and said stimulable phosphor sheet, whereby the light emitted from said stimulable phosphor sheet is detected by said photodetector via said light transferring means, wherein the improvement comprises the provision of (iv) a plate-like member closely contacted with said light output face of said light transferring means and exhibiting a refractive index approximately equal to that of said light guiding sheet-like material, (v) a first covering member closely contacted with said plate-like member, and (vi) a second covering member closely contacted with the circumferential surface of said photodetector for maintaining said light receiving face of said photodetector at a position standing face to face with said plate-like member in spaced relation, said second covering member being removably joined with said first covering member in liquid-tight condition, (vii) the space between said light receiving face of said photodetector and said plate-like member being filled in hermetically sealed condition with a transparent liquid exhibiting a refractive index approximately equal to that of said plate-like member.

In the present invention, the refractive indices of the light transferring means, the plate-like member, and the light receiving face of the photodetector are within the range of approximately 1.4 to 1.5. As the liquid present between the plate-like member and the light receiving face of the photodetector, it is necessary to use a transparent liquid exhibiting a refractive index as close to the refractive indices of the plate-like member and the light receiving face of the photodetector as possible in order to avoid interfacial reflection at the interfaces therebetween. For example, it is possible to use silicone oil, or the like.

In the present invention, the plate-like member should be fabricated of a transparent material exhibiting a refractive index approximately equal to that of the light guiding sheet-like material. The plate-like member should preferably be a filter passing only the light emitted by the stimulable phosphor sheet when it is exposed to stimulating rays.

The first covering member is closely contacted with the plate-like member in liquid-tight condition and removably joined with the second covering member in liquid-tight condition, thereby covering the outer surfaces of the photodetector together with the second covering member.

In order to removably join the first covering member and the second covering member, the covering members may be threaded and screw engaged with each other, or may be provided with hook joints or the like and joined thereby.

Further, in order to improve the liquid-tightness, seal rings such as gaskets or O-rings should preferably be fitted between the plate-like member and the first covering member, between the first covering member and the second covering member, and between the second covering member and the circumferential surface of the photodetector.

In the present invention, the photodetector is removably associated with the plate-like member by the first covering member and the second covering member via the hermetically sealed liquid layer. Therefore, when the photodetector which has a much shorter service life than the light transferring means and the plate-like member, has to be replaced, it is possible to readily remove the photodetector from the light transferring means and the plate-like member and replace the photodetector alone with new one. Thus the apparatus of the present invention is very economical as compared with the conventional apparatus.

Further, the space between the photodetector and the plate-like member is filled in hermetically sealed condition with a liquid exhibiting a refractive index approximately equal to those of the light receiving face of the photodetector and the plate-like member, so that no air layer exhibiting a different refractive index intervenes therebetween. Therefore, there is no risk of the light guided by the light transferring means suffering interfacial reflection at the interfaces between the photodetector and the plate-like member.

Also, when the first covering member and the second covering member are fabricated of a light-shielding material, it becomes unnecessary to apply a light-shielding coating material, a light-shielding tape, or the like to the outer surfaces of the photodetector. The inner surfaces of the first covering member and the second covering member should preferably exhibit optical characteristics such that they do not absorb the light emitted by the stimulable phosphor sheet when it is exposed to stimulating rays.

DESCRIPTION OF THE PREFERRED EMBODIMENTS

The present invention will hereinbelow be described in further detail with reference to the accompanying drawings.

Figure 1:
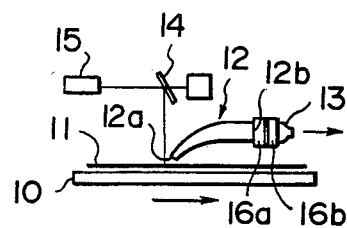
FIG. 1 is a side view showing an embodiment of the radiation image read-out apparatus in accordance with the present invention.
Figure 2:
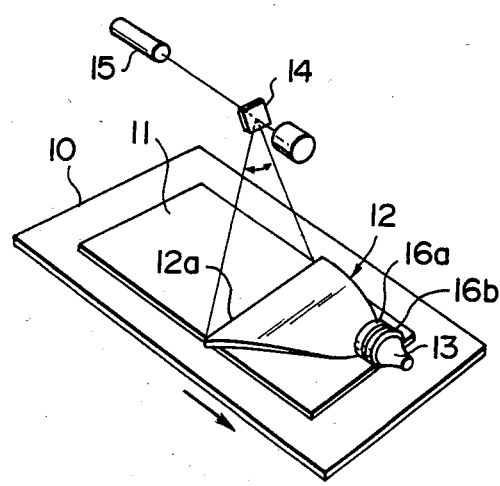
FIG. 2 is a perspective view showing the apparatus of FIG. 1.

FIGS. 1 and 2 show an embodiment of the radiation image read-out apparatus in accordance with the present invention wherein a photodetector having a circular light receiving face is used. A rectangular stimulable phosphor sheet 11 carrying a radiation image stored therein is placed on the surface of a linearly movable holder 10.

A light transferring means 12 is positioned so that a light input face 12a thereof is as close to the stimulable phosphor sheet 11 as possible, and a photodetector 13 is positioned to stand face to face with a light output face 12b of the light transferring means 12. A first covering member 16a and a second covering member 16b are installed to cover the joint portions of the light output face 12b and the photodetector 13 in hermetically sealed condition.

The photodetector 13 should preferably have as wide a light receiving area as possible, and should preferably exhibit a high signal-to-noise ratio since it is used to measure weak light. As the photodetector 13, for example, a head-on type photomultiplier provided with a light receiving face at one end is used.

Figure 3:
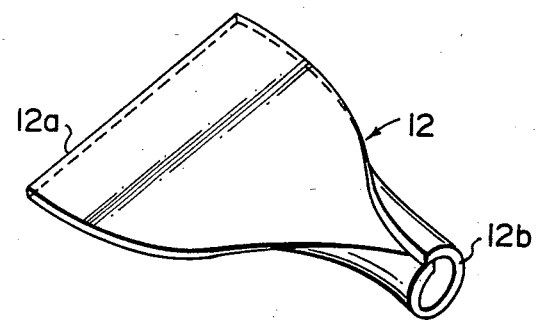
FIG. 3 is a perspective view showing the light transferring means of the apparatus of FIG. 1.

FIG. 3 shows the configuration of the light transferring means 12. One end face 12a of the light transferring means 12, i.e. the light input face, has a linear shape, and the other face 12b, i.e. the light output face standing face to face with the photodetector 13, has a ring shape matching the circular shape of a light receiving face 13a of the photodetector 13.

In FIGS. 1 and 2, a He-Ne gas laser beam emitted by a laser beam source 15 is deflected by a light deflector 14 in a direction approximately parallel to one edge of the stimulable phosphor sheet 11 to scan the sheet 11 in that direction. The red laser beam having a wavelength within the range of 600 nm to 700 nm which is emitted by the laser beam source 15 is thus deflected by the light deflector 14 and impinges upon the stimulable phosphor sheet 11 placed on the holder 10 to stimulate the stimulable phosphor layer of the sheet 11. As a result, the stimulable phosphor layer is stimulated to emit light in proportion to the radiation energy stored therein. Therefore, the light emitted from each scan point on the stimulable phosphor sheet 11 carries the information on the radiation image at that point.

While the stimulable phosphor sheet 11 is scanned by the laser beam in the aforesaid scanning direction, the sheet 11 is moved in the direction normal to the aforesaid scanning direction. As a result, the stimulable phosphor sheet 11 is two-dimensionally scanned, and light is emitted from each scan point on the sheet 11. The emitted light enters the light transferring means 12 from the light input face 12a thereof, and is guided inside of the light transferring means 12 to the light output face 12b thereof. Thus, the guided light enters the light receiving face of the photodetector 13 and is converted thereby into an electric image signal.

The electric image signal thus detected is used to control the laser beam modulator of a photographic film exposure apparatus. By use of a laser beam the intensity of which is controlled on the basis of the electric image signal, a visible radiation image is reproduced on a recording medium such as a photographic film.

Figure 4:
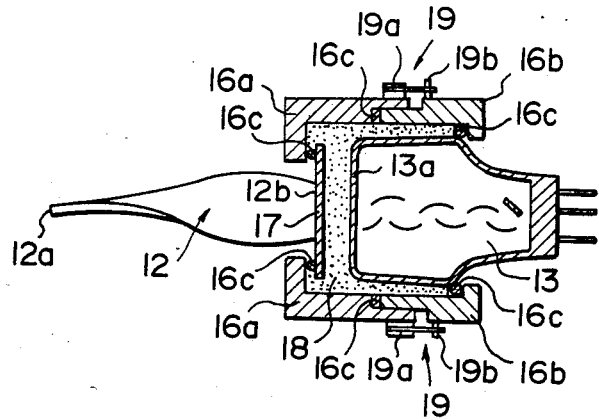
FIG. 4 is a partially sectional side view showing the light transferring means, the first and second covering members, and the photodetector of the apparatus of FIG. 1.

FIG. 4 is a partially sectional side view showing the light transferring means, the first and second covering members, and the photodetector used in the embodiment of FIG. 1. A plate-like member 17 is closely contacted with the light output face 12b of the light transferring means 12. The plate-like member 17 is constituted by a light filter which passes only blue light emitted by the stimulable phosphor sheet 11 and cuts off red stimulating rays, and exhibits a refractive index approximately equal to that of the light transferring means 12. The light receiving face 13a of the photodetector 13 is positioned to stand face to face with the plate-like member 17, and the space between the light receiving face 13a and the plate-like member 17 is filled with silicone oil 18. The light receiving face 13a and the silicone oil 18 have refractive indices approximately equal to that of the plate-like member 17. Since the plate-like member 17, the silicone oil 18 and the light receiving face 13a have approximately the same refractive indices (within the range of approximately 1.4 to 1.5), the light emitted by the stimulable phosphor sheet 11 and guided inside of the light transferring means 12 enters the photodetector 13 without suffering interfacial reflection.

The silicone oil 18 is hermetically sealed by the plate-like member 17, the light receiving face 13a, the first covering member 16a, and the second covering member 16b. Therefore, no air enters the silicone oil 18 from the outside. Further, since the silicone oil 18 has a high viscosity and is transparent, it is suitable for use in the radiation image read-out apparatus as described herein.

Seal rings 16c are fitted to the joint portion between the plate-like member 17 and the first covering member 16a, the joint portion between the first covering member 16a and the second covering member 16b, and the joint portion between the second covering member 16b and the circumferential surface of the photodetector 13, thereby improving the liquid-tightness at the joint portions.

Also, hook joints 19 are installed as a means for removably joining the first covering member 16a with the second covering member 16b. The first covering member 16a is provided with hook arms 19a which are engaged with pins 19b installed on the second covering member 16b. The second covering member 16b can be removed from the first covering member 16a by disengaging the hook arms 19a from the pins 19b.

Figure 5:
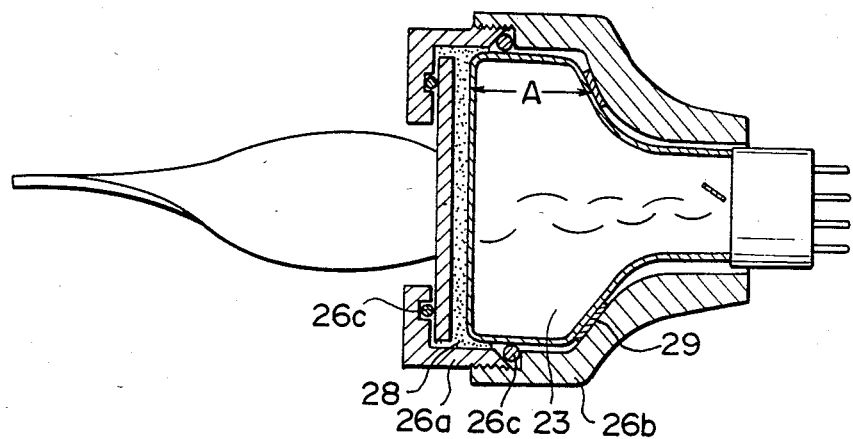
FIG. 5 is a partially sectional side view showing another embodiment of the hermetical sealing means of the apparatus in accordance with the present invention.

Another embodiment of the hermetical sealing means used in the apparatus of the present invention will hereinbelow be described with reference to FIG. 5. This embodiment is different from that of FIG. 4 in that a first covering member 26a is provided with an external thread, and a second covering member 26b is provided with an internal thread. Thus the first covering member 26a and the second covering member 26b are removably joined by screw engagement. Further, a seal ring 26c is fitted between the first covering member 26a and the circumferential surface of a photodetector 23 and pushed by the second covering member 26b to hermetically seal the space between the first covering member 26a and the photodetector 23. The first covering member 26a and the second covering member 26b have light-shielding property and cover the whole circumferential surface of the photodetector 23. Also, a sponge-like cushioning material 29 is positioned between the second covering member 26b and the photodetector 23. In this configuration, the number of the seal rings 26c can be reduced to two, and silicone oil 28 can be hermetically sealed more securely. Further, it is possible to securely fix the photodetector 23 even when the dimension A thereof deviates from the standard magnitude to some extent.

I claim:
1. A radiation image read-out apparatus including
   (i) a scanning means for scanning a stimulable phosphor sheet carrying a radiation image stored therein with stimulating rays which cause said stimulable phosphor sheet to emit light in proportion to the radiation energy stored,
   (ii) a photodetector for detecting the light emitted from said stimulable phosphor sheet, and
   (iii) a light transferring means having one end face constituting a light input face positioned close to a scan line on said stimulable phosphor sheet, and another face constituting a light output face formed to a shape matching the shape of a light receiving face of said photodetector and positioned close to said light receiving face, said light transferring means being fabricated of a light guiding sheet-like material exhibiting a refractive index approximately equal to that of said light receiving face and being positioned between said photodetector and said stimulable phosphor sheet, whereby the light emitted from said stimulable phosphor sheet is detected by said photodetector via said light transferring means, wherein the improvement comprises the provision of
   (iv) a plate-like member closely contacted with said light output face of said light transferring means and exhibiting a refractive index approximately equal to that of said light guiding sheet-like material,
   (v) a first covering member closely contacted with said plate-like member, and
   (vi) a second covering member closely contacted with the circumferential surface of said photodetector for maintaining said light receiving face of said photodetector at a position standing face to face with said plate-like member in spaced relation, said second covering member being removably joined with said first covering member in liquid-tight condition,
   (vii) the space between said light receiving face of said photodetector and said plate-like member being filled in hermetically sealed condition with a transparent liquid exhibiting a refractive index approximately equal to that of said plate-like member.

2. An apparatus as defined in claim 1 wherein seal rings are positioned at the close contact portion of said plate-like member with said first covering member, at the close contact portion of said first covering member with said second covering member, and at the close contact portion of said second covering member with the circumferential surface of said photodetector, thereby hermetically sealing at said portions.

3. An apparatus as defined in claim 2 wherein said first covering member is provided with hook arms, said second covering member is provided with pins for engagement with said hook arms, and said first covering member and said second covering member are removably joined with each other by the engagement of said hook arms with said pins.

4. An apparatus as defined in claim 1 wherein a seal ring is positioned at the close contact portion of said plate-like member with said first covering member, said first covering member is formed to a shape covering up to the circumferential surface of said photodetector, and a seal ring is positioned between said first covering member and the circumferential surface of said photodetector and pushed by said second covering member, thereby providing a hermetic seal between said first covering member and the circumferential surface of said photodetector.

5. An apparatus as defined in claim 4 wherein said first covering member is provided with an external thread, said second covering member is provided with an internal thread for screw engagement with said external thread, and said first covering member and said second covering member are removably joined with each other by screw engagement of said external thread with said internal thread.

6. An apparatus as defined in claim 4 wherein said second covering member is extended to cover the whole circumferential surface of said photodetector together with said first covering member.

7. An apparatus as defined in claim 6 wherein a cushioning material is positioned between said second covering member and the circumferential surface of said photodetector.

8. An apparatus as defined in any of claims 1 to 7 wherein said plate-like member is a filter passing only the light emitted from said stimulable phosphor sheet.

9. An apparatus as defined in any of claims 1 to 7 wherein said first covering member and said second covering member are fabricated of a light-shielding material.

10. An apparatus as defined in any of claims 1 to 7 wherein said transparent liquid is silicone oil.

* * * * *